United States Patent [19]

Uji et al.

[11] Patent Number: 5,051,476

[45] Date of Patent: Sep. 24, 1991

[54] MOUTH GUARD COMPOSITIONS

[75] Inventors: Toshiyasu Uji, Kumamoto; Shunichi Futami, Nagareyama; Kimihiko Sato, Ageo, all of Japan

[73] Assignee: G-C Dental Industrial Corp., Tokyo, Japan

[21] Appl. No.: 497,694

[22] Filed: Mar. 23, 1990

[30] Foreign Application Priority Data

Apr. 7, 1989 [JP] Japan .................................. 1-86976

[51] Int. Cl.⁵ ....................... C08L 67/04; C08L 31/04
[52] U.S. Cl. .................................. 525/186; 523/105; 523/121
[58] Field of Search ................. 525/186; 523/105, 121

[56] References Cited

U.S. PATENT DOCUMENTS 3,734,979  5/1973  Koleske ............................... 525/186

*Primary Examiner*—Patricia Short
*Attorney, Agent, or Firm*—Oblon, Spivak, McClelland, Maier & Neustadt

[57] ABSTRACT

An improved mouth guard composition comprises an ethylene/vinyl acetate copolymer and a thermoplastic polycarprolactone having a molecuar weight of 10,000–100,000, optionally with polyvinyl acetate, colorants and perfumes.

5 Claims, No Drawings

MOUTH GUARD COMPOSITIONS

BACKGROUND OF THE INVENTION

1. Field of the Invention

The present invention relates to a mouth guard composition which is rich in formability, viscoelasticity and impact resistance and suits the purpose of protecting the teeth, jawbones and intra-oral tissues from external forces.

2. Prior Art

Injury accidents occur frequently in sport games such as boxing, rugby or football. Most of the injuries are said to be caused by fracture of the teeth and jawbones. Protecting the interior of the mouth from such external wounds demands a material having suitable strength to external forces and an effect of cushioning external pressures.

For such protective materials (mouth guards), polyvinyl chloride (PVC), especially, ethylene/vinyl acetate copolymers (PVAc-PE) have generally been used.

Since intra-oral geometries differ from one person to another, if the materials well fitted the intra-mouth use can be easily made, such materials could be better for a mouth guard. Thus, the mouth guards materials should have the properties of imparting suitable elasticity to mouth guards, being well-fitted to intra-oral geometries and providing sufficient protection against external pressures.

Moreover, the mouth guard materials have to be supplied in such forms that allow dental clinicians to readily make mouth guards to the order of individuals, taking into account their cleanliness, taste, durability, the ease with which words are pronounced, etc.

The conditions which are required of materials used to protect the teeth, jawbones, etc. are that they should resist to occulsal pressures (withstand tearing-off by biting), be easy to wear, cushion external pressures to provide sufficient protection, be securely supplied, be easy to make and be of durability. Of the physical properties meeting such necessary conditions, the elasticity, tensile strength and elongation relate to the relaxation of external pressures and the protection and durability of the teeth and jawbones and, further, they represent the degree of the difficulty with which mouth guards are worn and maintained in place. The degree of water absorption stands for the degree of stability of the materials.

Generally available products have a hardness of 50-90, a tensile strength of 30-200 kg/cm², an elongation of 300-900% and a water absorption of 0.5-2.5%.

For mouth guards of such quality, polyvinyl chloride (PVC) or ethylene/vinyl acetate copolymers (PVAc-PE) have been used as their component.

PVC (polyvinyl chloride) is prone to be degraded by heat, light, etc. and not sufficiently durable. For that reason, it usually contains a stabilizer, and is additionally mixed with a plasticizer to adjust its softening temperature. However, such regulators are often undesirable to the human body because of their leaching.

PVAc-PE (ethylene/vinyl acetate copolymers) whose hardness and elasticity are regulated by the degree of polymerization and the ratio of polyethylene to polyvinyl acetate, are relatively often used as mouth guards. However, PVAc-PE can only be softened and formed at a temperature of 80°-100° C. by limiting both the degree of polymerization and the ratio of polyvinyl acetate to polyethylene to specific ranges so as to maintain the properties to resist impacts and protect teeth and jawbones and fit teeth. Another grave problems with PVAc-PE are that they are poor in durability and so poor in strength that they are easily torn off, they become too hot because of their high softening manipulation temperature, and are prone to be sticky to the hand at the time of forming.

SUMMARY OF THE INVENTION

A primary object of the present invention is to provide a mouth guard composition which contains thermoplastic polycaprolactone, and so has the physical properties of cushioning external pressures, protecting the teeth and jawbones, is well-fitted to the wearer, rich in durability and so rich in strength that it cannot possibly be torn off, not sticky to the hand so that an operator can handle it easily, and can be softened at a regulated low temperature, without using such additives that may have a harmful influence upon the human body, for instance, plasticizers, stabilizers and solvents.

DETAILED DESCRIPTION OF THE INVENTION

The thermoplastic elastic polymers, which may be used for the mouth guards of the present invention, are required to have the properties of being compatible with other resins and of chemical stability, elasticity and thermoplasticity. Suitable to this end are ethylene/vinyl acetate copolymers or mixtures of them with polyvinyl acetate. Optionally, such thermoplastic elastic polymers may be regulated by polycaprolactone.

The ethylene/vinyl acetate copolymers and polyvinyl acetate have such a high softening point that they become too hot at the time of press-forming. Alternatively, their adhesion is so excessive that they become sticky to the hand. Still alternatively, they are lacking in durability and so poor in strength that they can be torn off easily. So it is difficult to regulate such polymers to a quality suitable for mouth guards, and it has been therefore still impossible to obtain any satisfactory mouth guards.

According to the present invention, however, it has been found that the above disadvantages are substantially eliminated by the application of a thermoplastic polycaprolactone to mouth guard compositions, by taking notice of polycaprolactone having the properties of being softened at a temperature as low as 60° C., not sticky to the hand at all, of much higher stability and of high strength.

More specifically, the present invention provides a mouth guard composition comprising a combination of an ethylene/vinyl acetate copolymer or a mixture of it with polyvinyl acetate with a thermoplastic polycaprolactone whose softening point is about 60° C. and whose average molecular weight is 10,000 to 100,000.

The polycaprolactone usable in the present invention is expressed by the following structural formula:

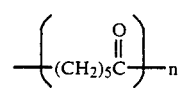

In order to take advantage of the thermoplastic polycaprolactone, protect the teeth and jawbones and achieve a proper softening-manipulation temperature, its amount should be at least 4.0% by weight. If the amount of the thermoplastic polycaprolactone in the mouth guard composition is below 4.0% by weight, it is then difficult to lower a softening temperature below 80° C. and prevent that composition from becoming sticky to the hand and fingers. When the thermoplastic polycaprolactone is added to the mouth guard composition in an amount exceeding 50% by weight, the toughness of the composition is improved, and the composition may be more easily softened because its softening point drops and its adhesiveness lowers, on the other hand it becomes difficult to provide the teeth and jawbones with sufficient protection, since it is too hardened to sufficiently cushion external pressures.

Thus the maximum amount of the thermoplastic polycaprolactone used in the present invention is suitably 50.0% by weight. In other words, the amount of the thermoplastic polycaprolactone incorporated accocrding to the present invention is limited to a range of 4.0–50.0% by weight.

It is noted that the softening point may be brought down to 60°–80° C. by the incorporation of the polycaprolactone having a molecular weight of 10,000–100,000 in an amount of 4.0–50.0% by weight.

For the colorants for the mouth guard compositions of the present invention, oil-soluble dyes and pigments which are free from stimulativeness and toxicity and insoluble in water should be used.

For instance, the oil-soluble dyes used may include C.I. solvent yellow 2, 14 or 15, C.I. solvent orange 2, C.I. disperse red 9, C.I. solvent violet 13 or 14, C.I. disperse violet 1, C.I. solvent blue 12, C.I. solvent brown 37 and C.I. solvent black 3 or 5.

The pigments used may be of either organic or inorganic types. Usable as the organic pigments are, for instance, aniline black, naphthol yellow S, benzidine yellow, quinoline yellow lake, anthrapyrimidine yellow, sudan I, permanent orange, indanthrene brilliant orange GR, permanent brown, para brown, permanent red 4R, para red, fire red, fast violet B, methyl violet lake, dioxazine violet, alkali blue lake, peacock blue lake, fast sky blue, indigo and pigment green B. The inorganic pigments may include, for instance, barytes powders, barium carbonate, silica powders, alumina white, zinc white, titanium dioxide, carbon black, yellow oxide iron, Ocher, iron oxide, red iron oxide, ultramarine blue and aluminium powders.

One or two or more of such pigments as mentioned above may be added to the mouth guard compositions of the present invention in trace quantity.

Any perfume which has a flash point of 80° C. or higher and a boiling point of 150° C. or higher and is less stimulative may be used.

Suitable natural perfumes may be, for example, sinnamon oil, aniseed oil, clove oil, patchouli oil, sandalwood oil and peppermint oil. Suitable synthetic perfumes may include numerous compounds represented by 3-octenol, cis-3-hexenol, linalool geraniol, nerol, rosinol, hydroxycitronellol, α-terpineol, α-menthol, l-carvone, p-methylacetophenone, benzyl butyrate, benzyl alcohol, phenylethyl alcohol, cinnamyl alcohol, dimethylbenzyl carbinol, acetyl anisole, eugenol, aldehyde C-14, aldehyde C-16, aldehyde C-18, aldehyde C-20 and the like.

One of such perfumes as mentioned above, or two or more of them, being mixed, may be added to the mouth guard compositions of the present invention in trace quantity.

The mouth guard composition of the present invention may be softened and pressed directly in the oral cavity of the user so as to be well-fitted thereinto. Alternatively, an intra-oral impression is taken with an alginate impression material, and a casting material such as gypsum is cast and cured in this counter-die to make a cast. Then, the mouth guard composition uniformly softened at 60°–80° C. is pressed against and formed on this cast, whereby a mouth guard well-fitted to the geometry of the oral cavity of each individual may be easily prepared.

Unexpectedly, the thus produced mouth guard is 2–5 times higher than a commercial product in tensile strength and so can provide the teeth and jawbones with a high degree of protection. The water absorption of this mouth guard is reduced to as small as ½–1/10, the figure indicating that it is very stable.

It is understood that a mouth guard made with the mouth guard composition of the present invention may be used as a gnashing preventive in sleep.

EXAMPLES

In what follows, the present invention will be explained specifically but not exclusively with reference to the following examples and comparative examples.

EXAMPLE 1

| | |
|---|---|
| Ethylene/vinyl acetate copolymer (containing 28% by weight of vinyl acetate) | 90.5 wt % |
| Polycaprolactone (having an average molecular weight of 40,000) | 9.5 wt % |

In a kneader set at a temperature of 110° C., the ethylene/vinyl acetate copolymer and polycaprolactone were kneaded together for 30 minutes. As measured by the ring and ball method (JIS K 2531), the kneaded product was found to have a softening point of 75° C. This product showed no stickiness to the hand at all, and was so softened by two-minute immersion in warm water of 75° C. that it could be easily pressed onto a dentition model. Various characteristic values of this product are all set forth in a table to be given later.

EXAMPLE 2

| | |
|---|---|
| Ethylene/vinyl acetate copolymer (containing 40% by weight of vinyl acetate) | 56 wt % |
| Polyvinyl acetate | 6 wt % |
| Polycaprolactone (having an average molecular weight of 100,000) | 38 wt % |

In a kneader set at a temperature of 115° C., the ethylene/vinyl acetate copolymer, polyvinyl acetate and polycaprolactone were kneaded together for 40 minutes. As measured by the ring and ball method (JIS K 2531), the kneaded product was found to have a softening point of 70° C. This product showed no stickiness to the hand at all, and was so softened by one-minute immersion in warm water of 70° C. that it could be easily pressed onto a dentition model. Various characteristic values of this product are all set forth in the table.

EXAMPLE 3

| | |
|---|---|
| Ethylene/vinyl acetate copolymer (containing 19% by weight of vinyl acetate) | 95 wt % |
| Polycaprolactone (having an average molecular | 5 wt % |

-continued weight of 10,000)

In a kneader set at a temperature of 130° C., the ethylene/vinyl acetate copolymer and polycaprolactone were kneaded together for 50 minutes. As measured by the ring and ball method (JIS K 2531), the kneaded product was found to show a softening point of 75° C. This product showed no sign of stickiness to the hand at all, and was so softened by two-minute immersion in warm water of 75° C. that it could be easily pressed onto a dentition model. Various characteristic values of this product are all summarized in the table.

EXAMPLE 4

| | |
|---|---|
| Ethylene/vinyl acetate copolymer (containing 25% by weight of vinyl acetate) | 75.5 wt % |
| Polycaprolactone (having an average molecular weight of 40,000) | 24.5 wt % |

In a kneader set at a temperature of 105° C., the ethylene/vinyl acetate copolymer and polycaprolactone were kneaded together for 30 minutes. As measured by the ring and ball method (JIS K 2531), the kneaded product was found to have a softening point of 72° C. This product showed no stickiness to the hand at all, and was so softened by one-minute immersion in warm water of 70° C. that it could be easily pressed onto a dentition model.

COMPARATIVE EXAMPLE 1

| | |
|---|---|
| Ethylene/vinyl acetate copolymer (containing 25% by weight of vinyl acetate) | 100 wt % |

As measured by the ring and ball method (JIS K 2531), this substance was found to have a softening point of 100° C. This material was so sticky to the hand during softening and so hot and so rapidly cured during softening/pressing and forming that its forming was difficult.

COMPARATIVE EXAMPLE 2

| | |
|---|---|
| Thermoplastic polyvinyl chloride (containing 20 wt % of a plasticizer) | 100 wt % |

As measured by the ring and ball method (JIS K 2531), this substance was found to have a softening point of 85° C., and was less sticky to the hand. However, it was so hot during softening/pressing and forming and so rapidly cured that its forming was difficult.

| Physical properties | Example 1 | Example 2 | Example 3 | Example 4 | Comparative Example 1 | Comparative Example 2 |
|---|---|---|---|---|---|---|
| Softening-manipulatability | ⊙ | ⊙ | ⊙ | ⊙ | X | Δ |
| Softening point (°C.) | 75 | 70 | 75 | 72 | 100 | 85 |
| Hardness | 68 | 75 | 66 | 72 | 76 | 80 |
| External pressure ratio | 48 | 56 | 46 | 51 | 58 | 70 |
| Tensile strength (kg/cm$^2$) | 200 | 320 | 250 | 280 | 150 | 120 |
| Elongation (%) | 600 | 700 | 850 | 750 | 900 | 300 |
| Water absorption (%) | 0.2 | 0.3 | 0.3 | 0.3 | 0.4 | 0.6 |

Softening Manipulatability
⊙: satisfactory pressing without becoming hot and sticky
○: satisfactory pressing without becoming substantially hot and sticky
Δ: almost satisfactory pressing with becoming slightly hot and sticky
X: less satisfactory pressing with becoming hot and sticky
Softening point: determined according to JIS K 2531
Hardness: determined according to JIS K 6301, spring type
External pressure ratio: Samples were tested with an autograph (made by Shimazu Co.) and an oscilloscope (National VP-5730A). The degree of cushioning was expressed in terms of percentage per 100 at the time of no protection against impact.
Impact load: 100 g; Falling distance: 100 mm; and Sample thickness: 3.0 mm
Lower values stand for lower impacts.
Tensile strength: determined according to JIS K 6301, No. 2 test piece Effect of the Invention From the results set forth in the above table, it has been found that the mouth guard compositions of the present invention show no stickiness to the hand and excel in softening manipulatability on account of their reduced softening points. From a comparison with the comparative examples, it has also been noted that the mouth guards obtained according to the examples of the present invention have their hardness and external pressure ratio brought down to lower levels, their tensile strength improved by a factor of 1.3–2.7, their water absorption reduced to as much as 25–70% and their elasticity and elongation regulated to suitable levels, and that they are improved in terms of stability and durability.

Thus, the mouth guard compositions of the present invention provides a material which is easily well-fitted into the oral cavity and can cushion external pressures sufficiently to lend itself well to protecting the teeth and jawbones.

What is claimed is:

1. A mouth guard composition comprising an ethylene/vinyl acetate copolymer and 4 to 50% by weight of a thermoplastic polycaprolactone having a molecular weight of 10,000–100,000.

2. A mouth guard composition comprising an ethylene/vinyl acetate copolymer, polyvinyl acetate and 4 to 50% by weight of a thermoplastic polycaprolactone having a molecular weight of 10,000–100,000.

3. A mouth guard composition as claimed in claim 1 or 2, with which a colorant and a perfume are additionally mixed.

4. A mouth guard of the composition of claim 1.

5. A mouth guard of the composition of claim 2.

* * * * *